United States Patent
Buckley et al.

(10) Patent No.: US 8,387,027 B2
(45) Date of Patent: Feb. 26, 2013

(54) METHOD AND SYSTEM FOR COMPILING A DYNAMICALLY-TYPED METHOD INVOCATION IN A STATICALLY-TYPED PROGRAMMING LANGUAGE

(75) Inventors: Alexander R. Buckley, Cupertino, CA (US); John Rose, San Jose, CA (US); Joseph D. Darcy, Mountain View, CA (US)

(73) Assignee: Oracle America, Inc. formerly Sun Microsystems, Inc., Redwood Shores, CA (US)

( * ) Notice: Subject to any disclaimer, the term of this patent is extended or adjusted under 35 U.S.C. 154(b) by 478 days.

(21) Appl. No.: 12/688,809

(22) Filed: Jan. 15, 2010

(65) Prior Publication Data
US 2011/0179402 A1    Jul. 21, 2011

(51) Int. Cl.
G06F 9/45    (2006.01)

(52) U.S. Cl. ...................................... 717/140; 717/148

(58) Field of Classification Search .................. 717/140, 717/146–148
See application file for complete search history.

(56) References Cited

U.S. PATENT DOCUMENTS

| | | | |
|---|---|---|---|
| 2008/0282238 A1* | 11/2008 | Meijer et al. | 717/162 |
| 2008/0295083 A1* | 11/2008 | Meijer et al. | 717/143 |

* cited by examiner

Primary Examiner — Anna Deng
(74) Attorney, Agent, or Firm — Osha Liang LLP

(57) ABSTRACT

A method for compiling source code, involving: obtaining a statement of the source code comprising a method call, where the source code is composed in a statically-typed programming language; determining whether the method call is a dynamic method call; upon determining that the method call is a dynamic method call, compiling a dynamic method invocation without performing type checking on the method call; upon determining that the method call is not a dynamic method call: performing type checking on the method call, selecting a target method to invoke, and compiling a static method invocation to invoke the target method.

12 Claims, 4 Drawing Sheets

US 8,387,027 B2

METHOD AND SYSTEM FOR COMPILING A DYNAMICALLY-TYPED METHOD INVOCATION IN A STATICALLY-TYPED PROGRAMMING LANGUAGE

BACKGROUND

Type checking of variables may be performed as part of compiling and executing computer programs. Type checking refers to verifying and enforcing the constraints of data types (e.g., integers, strings, floating-point numbers, etc.) within a program.

Type checking may be performed at compile-time (i.e., a static check) or at run-time (i.e., a dynamic check). Statically-typed programming languages perform type checking at compile-time. Examples of statically-typed programming languages include Java™, C, Fortran, and the like. Java™ is a registered trademark of Sun Microsystems, Inc., located in Santa Clara, Calif. Dynamically-typed programming languages perform type checking at run-time. Examples of dynamically-typed programming languages include Lisp, Perl, Smalltalk, and the like.

SUMMARY

In general, in one aspect, the invention relates to a method for compiling a dynamically-typed method invocation. The method includes obtaining a statement of the source code comprising a method call, where the source code is composed in a statically-typed programming language; determining whether the method call is a dynamic method call; upon determining that the method call is a dynamic method call, compiling a dynamic method invocation without performing type checking on the method call; upon determining that the method call is not a dynamic method call: performing type checking on the method call, selecting a target method to invoke, and compiling a static method invocation to invoke the target method.

In general, in one aspect, the invention relates to a system comprising a processor, a physical memory; and a computer usable storage medium having computer readable program code embodied therein. The computer readable program code is adapted to, when executed by the processor, implement a method. The method includes obtaining a statement of the source code comprising a method call, where the source code is composed in a statically-typed programming language; determining whether the method call is a dynamic method call; upon determining that the method call is a dynamic method call, compiling a dynamic method invocation without performing type checking on the method call; upon determining that the method call is not a dynamic method call: performing type checking on the method call, selecting a target method to invoke, and compiling a static method invocation to invoke the target method.

Other aspects of the invention will be apparent from the following description and the appended claims.

DETAILED DESCRIPTION

Figure 1:
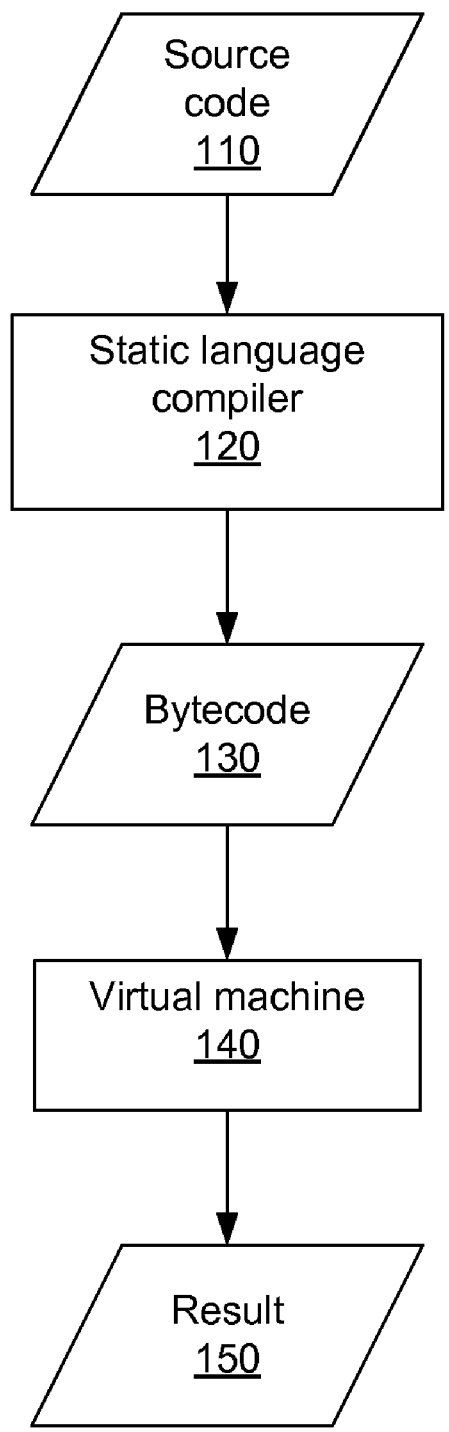
FIG. 1 shows a diagram of a data flow for compiling and executing source code, in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for invoking dynamically-typed methods in a statically-typed programming environment. In one or more embodiments of the invention, a type is reserved for invoking dynamically-typed methods. Further, in one or more embodiments of the invention, any invocations which use the reserved type are compiled without performing a compile-time method selection process that would ordinarily be performed if the invocation did not use the reserved type. Thus, in one or more embodiments of the invention, invocations of dynamically-typed methods may be compiled successfully without requiring type definitions of the methods to be available at compile-time. Further, in one or more embodiments, dynamically-typed methods whose names contain illegal characters (i.e., characters not permitted in identifiers of the statically-typed programming language) may be compiled without triggering an illegal-character error.

FIG. 1 shows a diagram of a data flow for compiling and executing source code (110), in accordance with one or more embodiments of the invention. Specifically, in one or more embodiments of the invention, source code (100) is compiled by a static language compiler (120) (i.e., a compiler configured for a specific statically-typed language), thereby producing bytecode (130). The source code (100) may be a program composed in a human-readable computer programming language (e.g., Java, C, etc.). Further, the bytecode (130) may be machine-independent instructions sets which are intermediate representations of the source code (e.g., Java bytecode). As shown in FIG. 1, at run-time, the bytecode (130) may be executed by a virtual machine (140), thereby producing a result (150). The result (150) may be any action or output produced by a program (e.g., a graphical display, a data output, an audio output, etc.).

In one or more embodiments, the virtual machine (140) may be an instruction set architecture-specific runtime environment designed to execute the bytecode (130). Examples of virtual machines include the Java Virtual Machine™ and the Microsoft.NET Common Language Runtime™. Java Virtual Machine™ is a registered trademark of Sun Microsystems, Inc., located in Santa Clara, Calif. Microsoft.NET Common Language Runtime™ is a registered trademark of Microsoft, Inc., located in Redmond, Wash.

Figure 2:
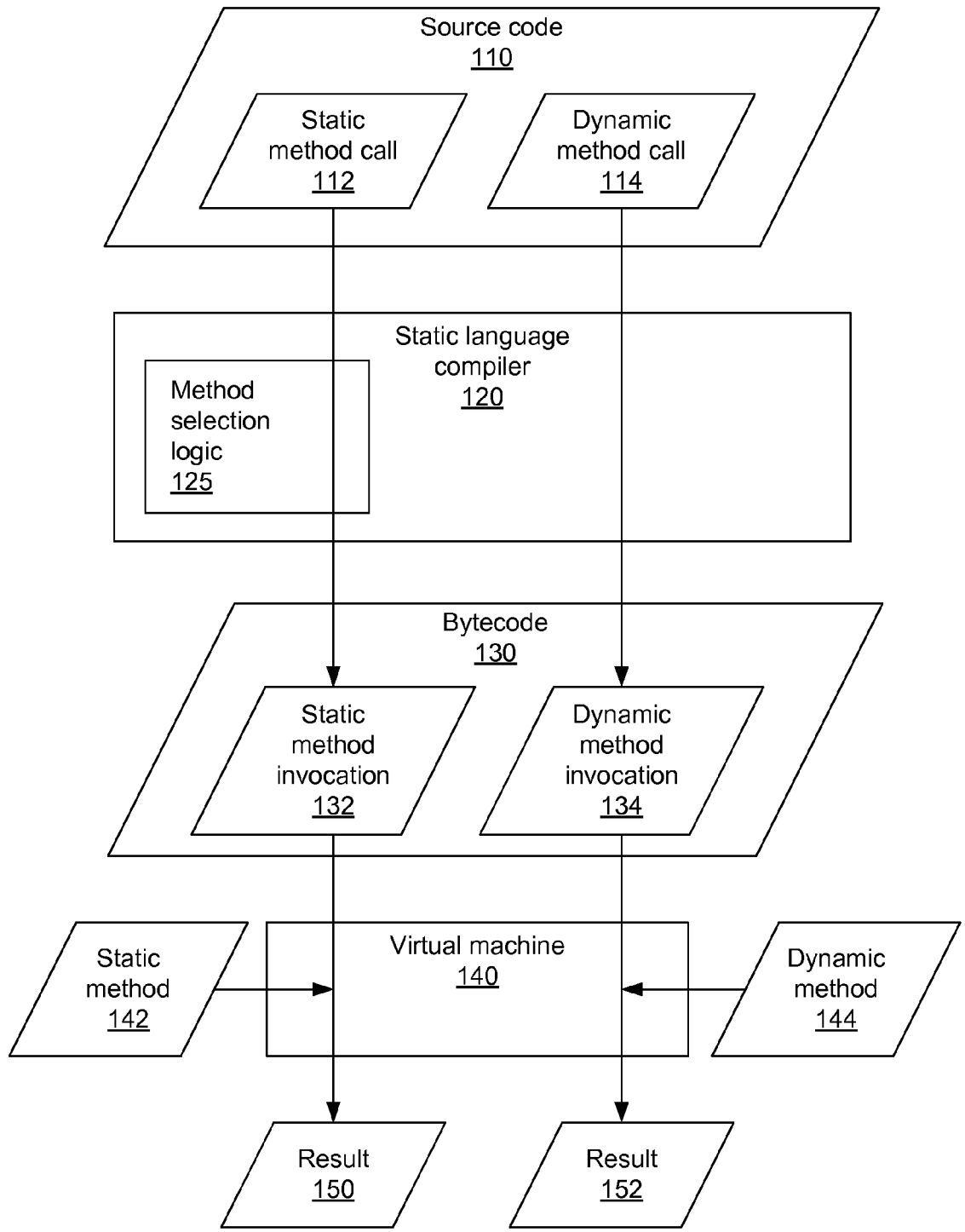
FIG. 2 shows a diagram of a software environment for compiling and executing source code, in accordance with one or more embodiments of the invention.

FIG. 2 shows a diagram of a software environment for compiling and executing source code, in accordance with one or more embodiments of the invention. In particular, the software environment shown in FIG. 2 corresponds to the data flow described above with reference to FIG. 1.

As shown in FIG. 2, the source code (100) may include a static method call (112) and/or a dynamic method call (114). As used herein, the term "method call" refers to a source code instruction requesting execution of a method (i.e., a subroutine associated with an object). Specifically, a method call may include a receiver variable (i.e., the object or class which may define the requested method), a method identifier (i.e., a unique name or identifier for the requested method), an argument variable, and a return variable. As used herein, the term "static" refers to the type discipline under which the target of a method call is selected.

In one or more embodiments, the static language compiler (120) may be configured to compile a static method call (112) in a different manner than a dynamic method call (114). More specifically, as shown in FIG. 2, the static language compiler (120) may include method selection logic (125) used to compile the static method call (112), thus resulting in the static method invocation (132) included in bytecode (130). As used herein, the term "method invocation" refers to a bytecode instruction requesting execution of a method. Further, as used herein, the term "static method invocation" refers to method invocation for a method chosen via compile-time method selection logic.

In one or more embodiments, the method selection logic (125) may be configured to analyze the static types of any variables included in the static method call (120) (e.g., static method identifier, argument variable(s), return variable(s), etc.). In particular, the method selection logic (125) may analyze characteristics (e.g., inheritance, overriding, overloading, substitutability, etc.) of the static method type. Further, the method selection logic (125) may be configured to use such static type information to select an appropriate method to include in the static method invocation (132).

At run-time, the virtual machine (140) invokes the static method (142) associated with the method identifier included in the static method invocation (132). In one or more embodiments, the virtual machine (140) may load any class files required to execute the static method (142). After executing the static method (142), the virtual machine (140) produces the result (150).

In one or more embodiments, the static language compiler (120) compiles the dynamic method call (114) without using the method selection logic (125), thus resulting in the dynamic method invocation (134) included in bytecode (130). Further, in one or more embodiments, the static language compiler (120) compiles the dynamic method call (114) without determining whether the dynamic method call (114) includes any illegal characters (i.e., characters defined as illegal within the statically-typed programming language). In one or more embodiments, the dynamic method call (114) enables the calling of methods including illegal characters without using prior art techniques (e.g., a reflective API call) which require more processing time and/or resources than the dynamic method call (114).

Furthermore, in one or more embodiments, any variables included in the dynamic method call (114) (e.g., method identifier, argument variable(s), return variable(s), etc.) are also included in the dynamic method invocation (134). For example, the dynamic method invocation (134) may include a descriptor specifying the same method identifier, argument variable(s), and return variable(s) included in the dynamic method call (114). The method identifier may be specified using, e.g., a syntactic method call, a special syntax (i.e., a syntax reserved for dynamic method calls), or a normal syntax used by the statically-typed programming language. Further, the argument variable type(s) may be specified implicitly (i.e., according to types of arguments passed), explicitly (i.e., within the arguments), by a special syntax, or by an explicit type parameter. Further, the return variable type(s) may be specified as a explicit argument, using a special syntax, or in an explicit type parameter.

In one or more embodiments, the dynamic method call (114) may be composed using a type reserved for calling dynamically-typed methods. Alternatively, in one or more embodiments, the dynamic method call (114) may be composed using a type reserved for calling methods not composed in a statically-typed programming language. In one or more embodiments, the static language compiler (120) may be configured to recognize a method call composed with the reserved type (i.e., a dynamic method call), and to not use the method selection logic (125) to compile such a method call. In one or more embodiments, the method identifier included in the dynamic method call (114) may not be automatically used in the dynamic method invocation (134) in the bytecode (130).

At run-time, the virtual machine (140) invokes the dynamic method (144) associated with the method identifier included in the bytecode emitted for the dynamic method invocation (134). In one or more embodiments, the virtual machine (140) may load any class files required to execute the dynamic method (144). After executing the dynamic method (144), the virtual machine (140) produces a result (152) (e.g., a graphical display, a data output, an audio output, etc.). Note that all or parts of the software environment shown in FIG. 2 may be used with (or included in) various software development tools, such as an integrated development environment (IDE), a command-line interpreter (CLI), and/or a graphical user interface (GUI) (not shown).

Figure 3:
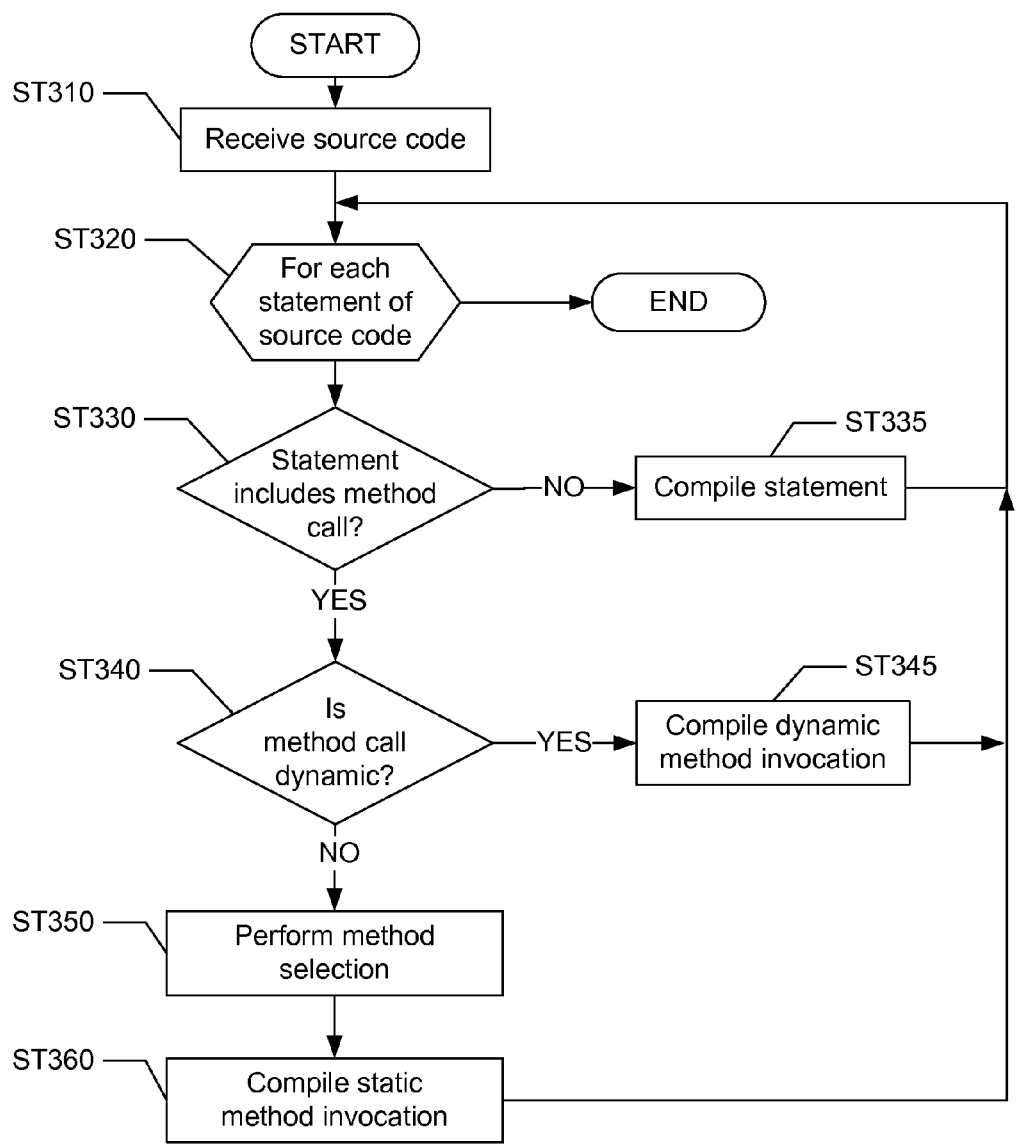
FIG. 3 shows a flowchart of a method for compiling source code, in accordance with one or more embodiments of the invention.

FIG. 3 shows a flowchart of a method for compiling source code, in accordance with one or more embodiments of the invention. In particular, FIG. 3 illustrates a method for compiling invocations of dynamically-typed methods using a reserved class, in accordance with one or more embodiments. Further, the method shown in FIG. 3 corresponds to the software environment described above with reference to FIG. 2. In one or more embodiments of the invention, one or more of the steps described below may be omitted, repeated, performed in parallel, and/or performed in a different order. Accordingly, the specific arrangement of steps shown in FIG. 3 should not be construed as limiting the scope of the invention.

At ST310, source code (e.g., source code (110) shown in FIGS. 1-2) may be received. For example, a programmer may compose source code in the Java™ programming language, and may submit the source code to a Java™ compiler. In one or more embodiments, the source code may include static and/or dynamic method calls (e.g., static method call (112) and/or dynamic method call (114) shown in FIG. 2). At ST320, a loop to process each statement of the source code may be entered.

At ST330, a determination is made about whether the current statement includes a method call. If it is determined that the current statement does not include a method call, then at ST335, the current statement is compiled into bytecode. After ST335, the processing of the current statement is complete, and the flowchart returns to ST320 to begin processing another statement. However, if it is determined that the current statement includes a method call, then at ST340, a determination is made about whether the method call is dynamic. For example, such a determination may be based on whether the method call is composed using a reserved type reserved for dynamic method calls.

If it is determined at ST340 that the method call is dynamic, then at ST345, the dynamic method call is compiled without using method selection logic (e.g., method selection logic (125) shown in FIG. 2). In one or more embodiments, such compilation results in a dynamic method invocation (e.g., dynamic method invocation (134) shown in FIG. 2) which includes the same method identifier specified in the dynamic method call. After ST345, the processing of the current statement is complete, and the flowchart returns to ST320 to begin processing another statement.

However, if it is determined at ST340 that the method call is not dynamic (i.e., a static method call), then at ST350, method selection may be performed. For example, ST350 may use method selection logic (e.g., method selection logic (125) shown in FIG. 2) to analyze the static types of any variables included in the method call, and to use such static type information to select an appropriate method to include in the compiled bytecode (e.g., bytecode (130) shown in FIG. 2). At ST360, a static method invocation (e.g., static method invocation (132) shown in FIG. 2) may be compiled in the bytecode using the method selected at ST350. After ST360, the processing of the current statement is complete, and the flowchart returns to ST320 to begin processing another statement. Once all statements in the source code have been processed, the process terminates.

Table 1 shows an example of source code using a dynamic method invocation, in accordance with one or more embodiments of the invention. Specifically, the source code example shown in Table 1 is written in a form of the Java™ programming language that supports dynamically-typed method invocation.

TABLE 1

Source Code Example

```
TestClass tc = new TestClass( );
java.dyn.Dynamic d = java.dyn.Dynamic.createDynamic(tc);
try {
    d.invoke("m", 1);
} catch (Exception e) {
    e.printStackTrace( );
}
```

Table 2 shows an example of bytecode resulting from compiling the source code of the "d.invoke ('m', 1)" statement of Table 1. Specifically, the bytecode example shown in Table 2 is written in Java™ bytecode for the Java™ virtual machine

TABLE 2

Bytecode Example

```
aload_1        // Load reference to local variable 'd' to stack
getfield #2;   // Replace 'd' by 'tc' on the stack
iconst_1       // Load int constant 1 to the stack
invokedynamic #5   // Call
information:   "m"(Ljava/lang/Object;I)Ljava/lang/Object;
```

In the example of Table 1, the receiver variable "d" is defined using the "Dynamic" class reserved for calling dynamically-typed methods. Thus, the statement "d.invoke ('m', 1)" is defined as a dynamic method invocation. Accordingly, in one or more embodiments, this statement is compiled, without using method selection, into the bytecode statement "invokedynamic #5," as shown in the bytecode example of Table 2. Those skilled in the art will appreciate that Table 1 and Table 2 are provided for exemplary purposes only, and should not be construed as limiting the scope of the invention.

Figure 4:
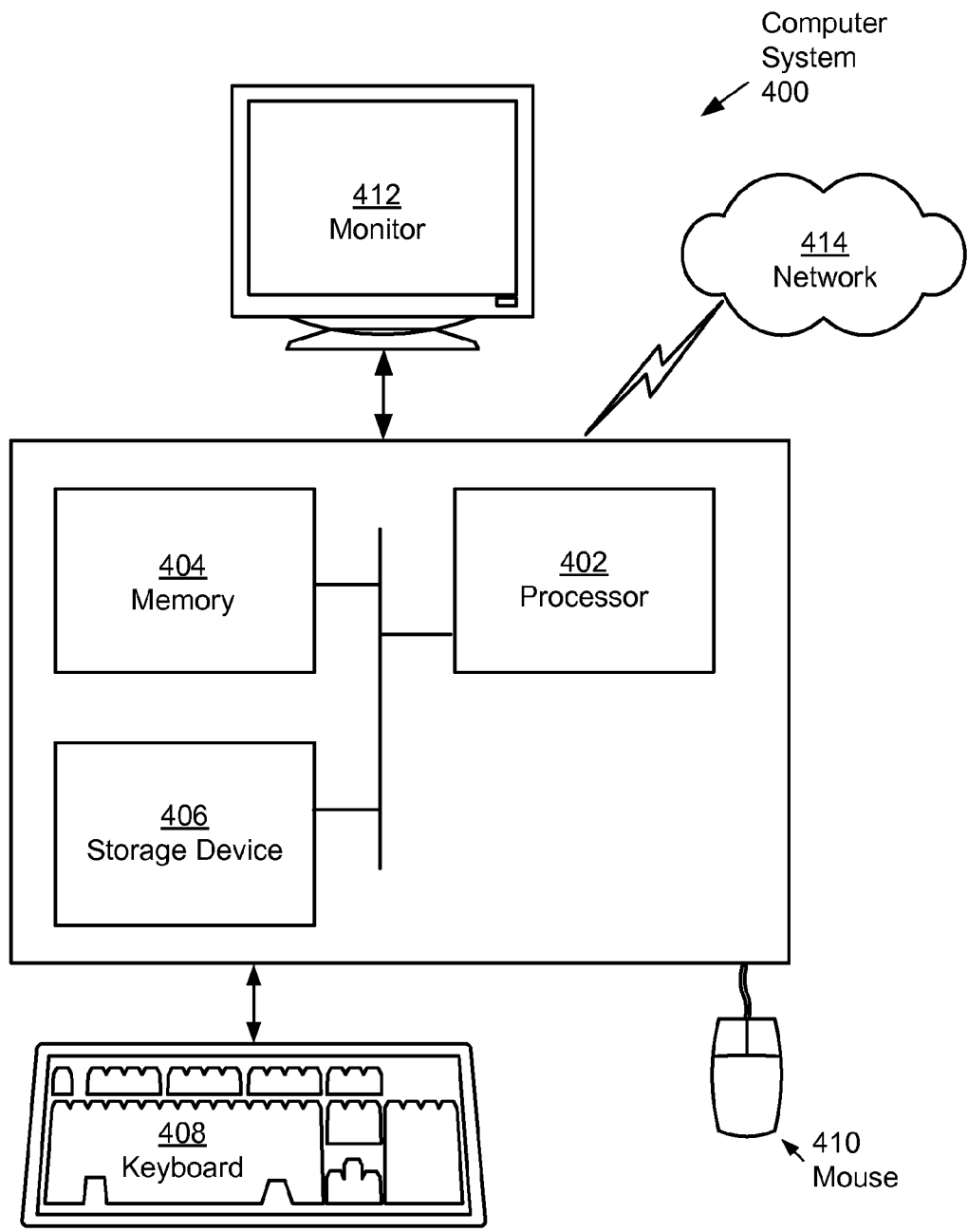
FIG. 4 shows a diagram of a computer system, in accordance with one or more embodiments of the invention.

Embodiments of the invention may be implemented on virtually any type of computer regardless of the platform being used. For example, as shown in FIG. 4, a networked computer system (400) includes a processor (402), associated memory (404), a storage device (406), and numerous other elements and functionalities typical of today's computers (not shown). The networked computer (400) may also include input means, such as a keyboard (408) and a mouse (410), and output means, such as a monitor (412). The networked computer system (400) is connected to a network (414) (e.g., a local area network (LAN), a wide area network, etc.) via a network interface connection (not shown). Those skilled in the art will appreciate that these input and output means may take other forms. Further, those skilled in the art will appreciate that one or more elements of the aforementioned computer (400) may be remotely located and connected to the other elements over a network. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable storage medium having computer readable program code embodied therein, the computer readable program code adapted to, when executed by a processor, implement a method for compiling source code, the method comprising:
  obtaining a statement of the source code, wherein the statement comprises a first method call, wherein the first method call comprises a first method name, a first argument, and a second argument, wherein the first argument is a second method name for a second method call and wherein the second argument is an argument for the second method call, and wherein the source code is composed in a statically-typed programming language;
  determining that the first method call is a dynamic method call based on the first method name;
  upon determining that the first method call is a dynamic method call:
    compiling a dynamic method invocation for the second method call without performing type checking on the second method call.

2. The non-transitory computer readable storage medium of claim 1, wherein the second method is composed using one selected from a group consisting of a statically-typed programming language and a dynamically-typed programming language.

3. The non-transitory computer readable storage medium of claim 1, wherein the dynamic method invocation is compiled into bytecode.

4. The non-transitory computer readable storage medium of claim 1, wherein compiling the dynamic method invocation is performed without determining whether the second method call includes any characters defined as illegal within the statically-typed programming language.

5. The non-transitory computer readable storage medium of claim 1, wherein the second method name is specified using one selected from a group consisting of a string argument to a syntactic method call, a special syntax, and a normal syntax used by the statically-typed programming language.

6. The non-transitory computer readable storage medium of claim 1, wherein the dynamic method invocation comprises at least one argument type, and wherein the at least one argument type is specified using one selected from a group consisting of an implicit argument, an explicit argument, a special syntax, and a type argument.

7. The non-transitory computer readable storage medium of claim 1, wherein the dynamic method invocation comprises at least one return type, and wherein the at least one return type is specified using one selected from a group consisting of an explicit argument, a special syntax, and a type argument.

8. A system, comprising:
a processor;
a physical memory; and
a non-transitory computer usable storage medium having computer readable program code embodied therein, the computer readable program code adapted to, when executed by the processor, implement a method for compiling source code, the method comprising:
obtaining a statement of the source code, wherein the statement comprises a first method call, wherein the first method call comprises a first method name, a first argument, and a second argument, wherein the first argument is a second method name for a second method call, and wherein the second argument is an argument for the second method call, and wherein the source code is composed in a statically-typed programming language;
determining that the first method call is a dynamic method call based on the first method name;
upon determining that the first method call is a dynamic method call:
compiling a dynamic method invocation for the second method call without performing type checking on the second method call.

9. The system of claim 8, wherein the second method is composed using one selected from a group consisting of a statically-typed programming language and a dynamically-typed programming language.

10. The system of claim 8, wherein the dynamic method invocation is compiled into bytecode.

11. The system of claim 8, wherein compiling the dynamic method invocation is performed without determining whether the second method call includes any characters defined as illegal within identifiers of the statically-typed programming language.

12. The system of claim 8, wherein the method name is specified using one selected from a group consisting of a string argument to a syntactic method call, a special syntax, and a normal syntax used by the statically-typed programming language.

* * * * *